United States Patent
Lai

[19]

[11] Patent Number: 6,034,805
[45] Date of Patent: Mar. 7, 2000

[54] TWO DIMENSIONAL SCANNER FOR A DEEP-UV LASER BEAM

[76] Inventor: Ming Lai, 1190 Encinitas Blvd., 208C, Encinitas, Calif. 92024

[21] Appl. No.: 09/299,273

[22] Filed: Apr. 25, 1999

Related U.S. Application Data

[60] Provisional application No. 60/083,247, Apr. 27, 1998.
[51] Int. Cl.[7] .................................................. G02B 26/08
[52] U.S. Cl. .................... 359/202; 359/201; 359/359; 359/857; 359/862; 359/872
[58] Field of Search ................... 359/198, 201, 359/202, 350, 359, 584, 857, 589, 862, 871, 872, 578; 235/462.36, 462.38, 468, 470; 606/18

[56] References Cited

U.S. PATENT DOCUMENTS

| | | | |
|---|---|---|---|
| 3,782,803 | 1/1974 | Buck | 359/201 |
| 4,070,089 | 1/1978 | Grafton . | |
| 5,094,523 | 3/1992 | Reznichenko et al. . | |
| 5,604,629 | 2/1997 | Hunter et al. | 359/359 |
| 5,637,851 | 6/1997 | Swantz et al. . | |

FOREIGN PATENT DOCUMENTS

| 2569865 | 3/1986 | France | 359/202 |
|---|---|---|---|

OTHER PUBLICATIONS

General Scanning. Inc, Product drawing X43037 Apr. 1986.
Cambridge Technology, Inc, Product drawing XY6850 May 1994.

*Primary Examiner*—Darren E. Schuberg

[57] ABSTRACT

A two-dimensional scanning method and apparatus are disclosed for improving the throughput of a deep-UV laser beam. Only reflection of s polarization is used and the incident angles on both x-y mirrors can be adjusted simultaneously without altering the direction of the output beam.

5 Claims, 2 Drawing Sheets

TWO DIMENSIONAL SCANNER FOR A DEEP-UV LASER BEAM

This application claims the benefit of US provisional application Ser. No. 60/083,247, filed on Apr. 27, 1998.

TECHNICAL FIELD

The present invention relates to a two dimensional scanner. In particular, the present invention relates to a two dimensional scanner for a deep-ultraviolet laser beam.

BACKGROUND

A two-dimensional scanner may be formed by using two single-axis scanners, scanning around two orthogonal axes. Most two-dimensional laser beam scanners are for lasers with wavelength in the range from 350 nm to 1500 nm. Mirrors with metallic or dielectric coatings in this wavelength range can have relatively high reflectivity (>98%) for input laser beam in either s or p polarization and for a large range of incident angle (>10 degrees). High throughput can be easily achieved for scanners in this wavelength range and is thus not a special issue in the design of these scanners.

Two-dimensional scanners with good and consistent throughput are much more difficult to manufacture for lasers with wavelength in the deep UV range from 150 nm to 250 nm. In this wavelength range, usually only dielectric-coated mirrors can be used. Due to a limited selection of coating materials, the reflectivity of a dielectric coating in this wavelength range is much sensitive to the polarization and the incident angle of an input beam. For a deep-UV mirror specified for 45 degree incidence, the reflectivity for s polarization is typically 98%, while for p polarization is typically 92%. The reflectivity drops significantly from its optimum value if the incident angle is a few degrees off from an optimum angle of incidence. This optimum angle of incidence changes sensitively with the laser wavelength. In addition, the optimum angle of incidence for optimum reflectivity may shift from its specified angle, may vary from coating to coating runs, and may change with humidity and the age of the mirrors.

An X-Y scanner for a deep-UV laser beam has two of these dielectric mirrors and the transmission loss is usually higher than 10%. Most scanners are designed for large angle scanning and for lasers with random polarization. A typical design is to make the out-going beam from the scanner perpendicular to the input beam. Two examples are commercial x-y scanners from General Scanning, Inc. and Cambridge Technology, Inc. For those scanners, significant improvement on their throughput for deep-UV beam is difficult without improving the mirrors available.

In some applications, linearly-polarized laser beams are used and only small angle scanning is required. An example of these applications is photorefractive surgery with a deep-UV laser beam from a solid-state laser source. It is highly desirable for these applications to manufacture two-dimensional scanners with improved throughput by employing commonly available mirrors.

SUMMARY

In this subject invention, a two-dimensional scanner with improved throughput is disclosed for a deep-UV laser beam, in particular for a deep-UV laser beam with a linear polarization and a small angle scanning. The improvement is achieved by applying only reflections of s polarization and by enabling simultaneous adjustment of the incident angles on the two mirrors without varying the direction of the output beam. This scanner is particularly useful for a deep-UV laser beam with a less defined wavelength, such as that generated from a broad-band solid-state laser source.

Accordingly, one aspect of the present invention is to provide a two-dimensional scanner with improved throughput for a deep-UV laser beam. Another aspect of the present invention is to provide a two-dimensional scanner with improved throughput using commonly available dielectric mirrors.

In a preferred embodiment of the present invention, the two scanner mirrors are arranged approximately parallel to each other and thus the incident angle of an input beam will be about the same on the two mirrors. The input beam and the mirrors are such arranged and aligned that the laser beam remains approximately in a same incident plane throughout the scanner.

The polarization of the input beam is aligned perpendicular to the incident plane and so the reflections on both scanner mirrors are of s-polarization. The reflection loss of p polarization can thus be avoided.

The two scanner heads are fixed on the same base plate. The two scanner mirrors remain parallel from each other while the base plate is rotated. By this way, the incident angles on the two scanner mirrors can be optimized simultaneously without changing the direction of the output beam. The throughput of the scanner can thus be maximized easily for a given pair of mirrors at a given wavelength. These and other aspects and advantages of the invention will become more apparent in the following drawings, detailed description and claims.

DETAILED DESCRIPTION OF THE PREFERRED EMBODIMENTS

Figure 1:
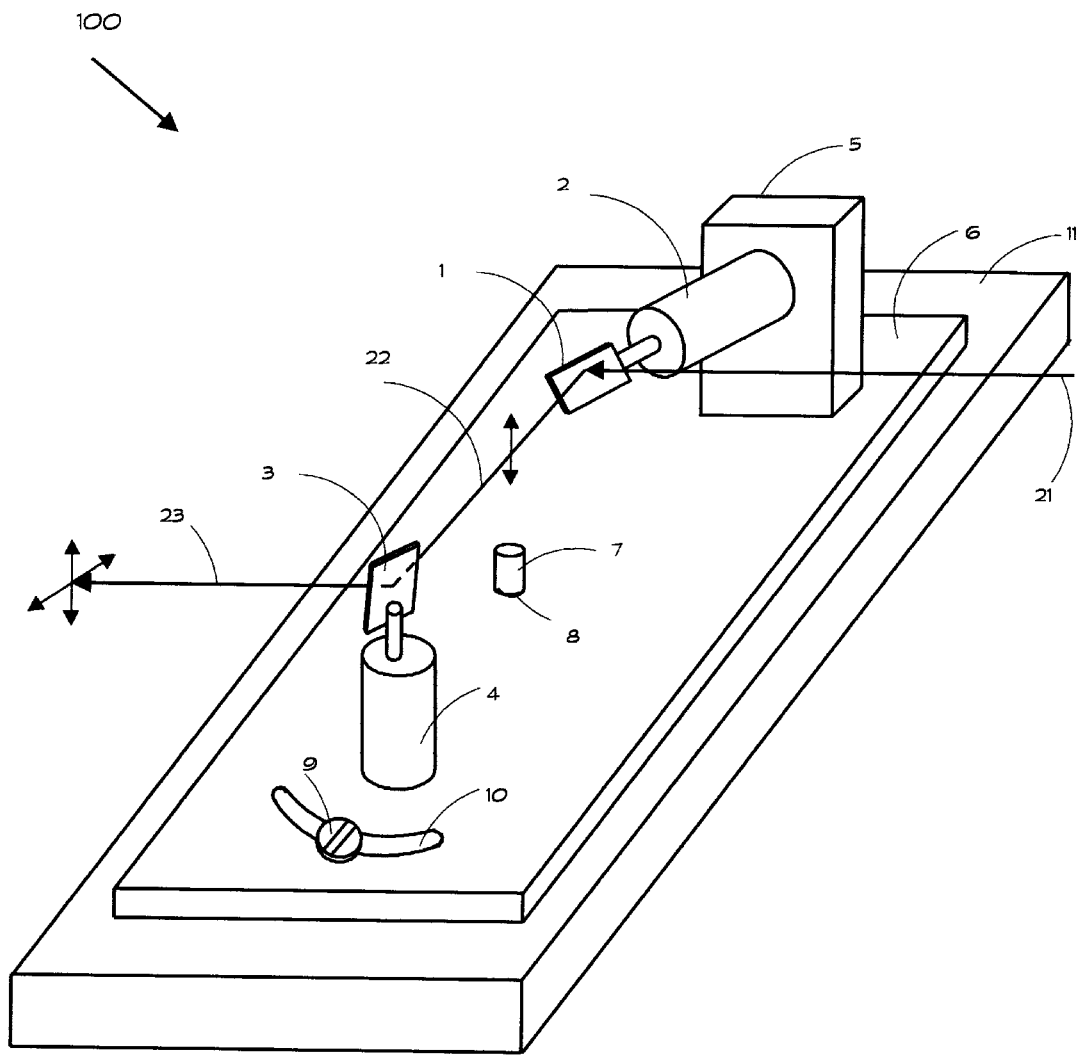
FIG. 1 is a schematic diagram of one embodiment of the present invention.

FIG. 1 is a schematic diagram of a two-dimensional scanner 100 according to one embodiment of the present invention. The scanner 100 includes a first scanner mirror 1 driven by a first scanner head 2 and a second scanner mirror 3 driven by a second scanner head 4. The first scanner head 2 is mounted on a stand 5, which is then fixed on a base plate 6. The second scanner head 4 is mounted directly onto the base plate 6. The first and second scanner mirrors have the same height from the base plate 6.

An imaginary deep-UV laser beam 21 enters the scanner 100 along a predetermined path parallel to the base plate 6. The imaginary beam 21 is linearly polarized and its polarization is perpendicular to the base plate 6. This beam 21 hits the first scanner mirror I and is reflected as beam 22 to the second scanner mirror 3. The reflected beam 22 is reflected into beam 23 to exit from the scanner 100. The first mirror 1 and the second mirror 3 are such located and orientated that the beams 21, 22, and 23 all stay approximately in an imaginary plane parallel to the base plate 6.

With the above arrangement and alignment, the polarization of the beams 17, 18, and 19 are all perpendicular to the imaginary plane and the reflections on both mirrors 1 and 3 are of s polarization. High loss reflection of p polarization is therefore eliminated.

A more preferable alignment is to make the output beam 23 approximately parallel with the input beam 21. In this case, the first scanner mirror 1 and the second scanner mirror 3 are approximately parallel from each other, and the incident angle on mirror 1 is about equal to that on mirror 3. The coatings on the two scanner mirrors are preferably from the same coating run and the incident angle should be set at the specified incident angle of the mirrors.

The base plate 6 has a hole 8 fitting through a pin 7. The pin 7 is fixed on a stationary platform 11. The hole 8 is located at about the middle point between the mirror 1 and the mirror 3. A screw 9 passing through a slot 10 to tie the base plate 6 onto the platform 11.

When the screw 9 is untied, the base plate 6 can be rotated around pin 7 to adjust the incident angle of beam 21 on the first scanner mirror 1. Because mirror 1 and mirror 3 are approximately parallel, the incident angle on mirror 3 changes with that on mirror 1 and the direction of the output beam 23 remains unchanged. This simultaneous adjustment on the incident angles enables an easy optimization of the scanner's throughput for any given pair of mirrors at any given wavelength.

To operate the two-dimensional scanner 100, a vertically-polarized deep-UV laser beam 21 is directed into the scanner 100 along a predetermined path. The throughput of the scanner 100 is optimized by a rotation adjustment on the base plate 6. The base plate 6 is then tied onto the platform 11. The first mirror 1 scans the beam 22 vertically and so the incident angle on the second mirror 3 is approximately constant. The second mirror 3 scans the beam 23 horizontally. The output beam 23 can thus be scanned in two dimensions.

Figure 2:
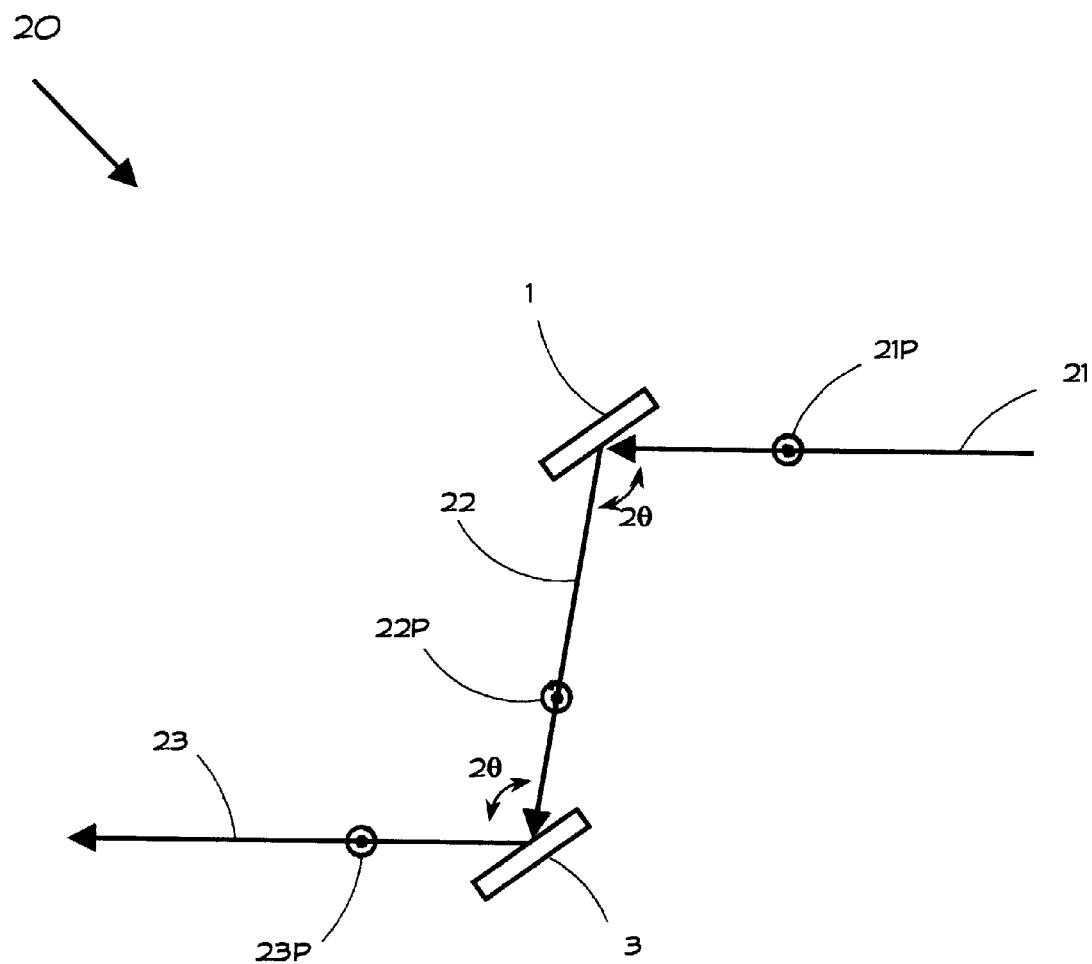
FIG. 2 is a schematic diagram showing the optical path and beam polarization in the scanner of FIG. 1.

FIG. 2 is a schematic diagram showing a top view of the optical path and beam polarization in the scanner 100 of FIG. 1. The two scanner mirrors 1 and 3 are arranged approximately parallel from each other. An input beam 21 enters from a predetermined path to hit the first scanner mirror 1, reflects to the second scanner mirror 3, and then exits the scanner 100 as an output beam 23. The incident angles on the mirrors 1 and 3 are about the same and equal approximately to the specified incident angle of the mirrors. The output beam 23 is approximately parallel with the input beam 21. The beam polarization remains unchanged through out the scanner, as indicated by 21p, 22p, and 23p.

What is claimed is:

1. An apparatus for scanning a deep-UV laser beam in two dimensions comprising:

a first scanner mirror having a dielectric coating for a predetermined deep-UV wavelength at a specified angle of incidence;

a second scanner mirror having a dielectric coating for said deep-UV wavelength at said angle of incidence;

a first scanner head to drive said first scanner mirror;

a second scanner head to drive said second scanner mirror;

a base plate having a rotation adjustment relative to a stationary platform; and means to fix said first and second scanner heads onto said base plate;

wherein said first and second scanner mirrors are located and orientated such that an imaginary beam entering along a predetermined path is reflected within approximately an imaginary plane and that the incident angles of said imaginary beam on said first and second scanner mirrors are approximately equal to a specified angle, said incident angles can be adjusted simultaneously by rotating said base plate.

2. An apparatus as defined in claim 1 wherein said deep UV wavelength is within a range from 150 nm to 250 nm.

3. An apparatus as defined in claim 1 wherein said first and second scanner heads are galvanometers.

4. An apparatus as defined in claim 1 wherein said rotation adjustment is made around an axis located at about middle point between said first and second scanner mirrors.

5. A method for scanning a deep-UV laser beam in two dimensions comprising the steps of:

providing a first scanner mirror having a dielectric coating for a predetermined deep-UV wavelength at a specified angle of incidence;

providing a second scanner mirror having a dielectric coating for said deep-UV wavelength at said angle of incidence;

providing a first scanner head to drive said first scanner mirror;

providing a second scanner head to drive said second scanner mirror;

providing a base plate having a rotation adjustment relative to a stationary platform;

providing means fixing said first and second scanner heads onto said base plate;

locating and orientating said first and second scanner mirrors such that a deep-UV laser beam entering along a predetermined path is reflected within approximately an imaginary plane and that the incident angles of said deep-UV laser beam on said first and second scanner mirrors are approximately equal to a specified angle; and adjusting said incident angles simultaneously by rotating said base plate to optimize the throughput of said deep-UV laser beam.

* * * * *